UNITED STATES PATENT OFFICE.

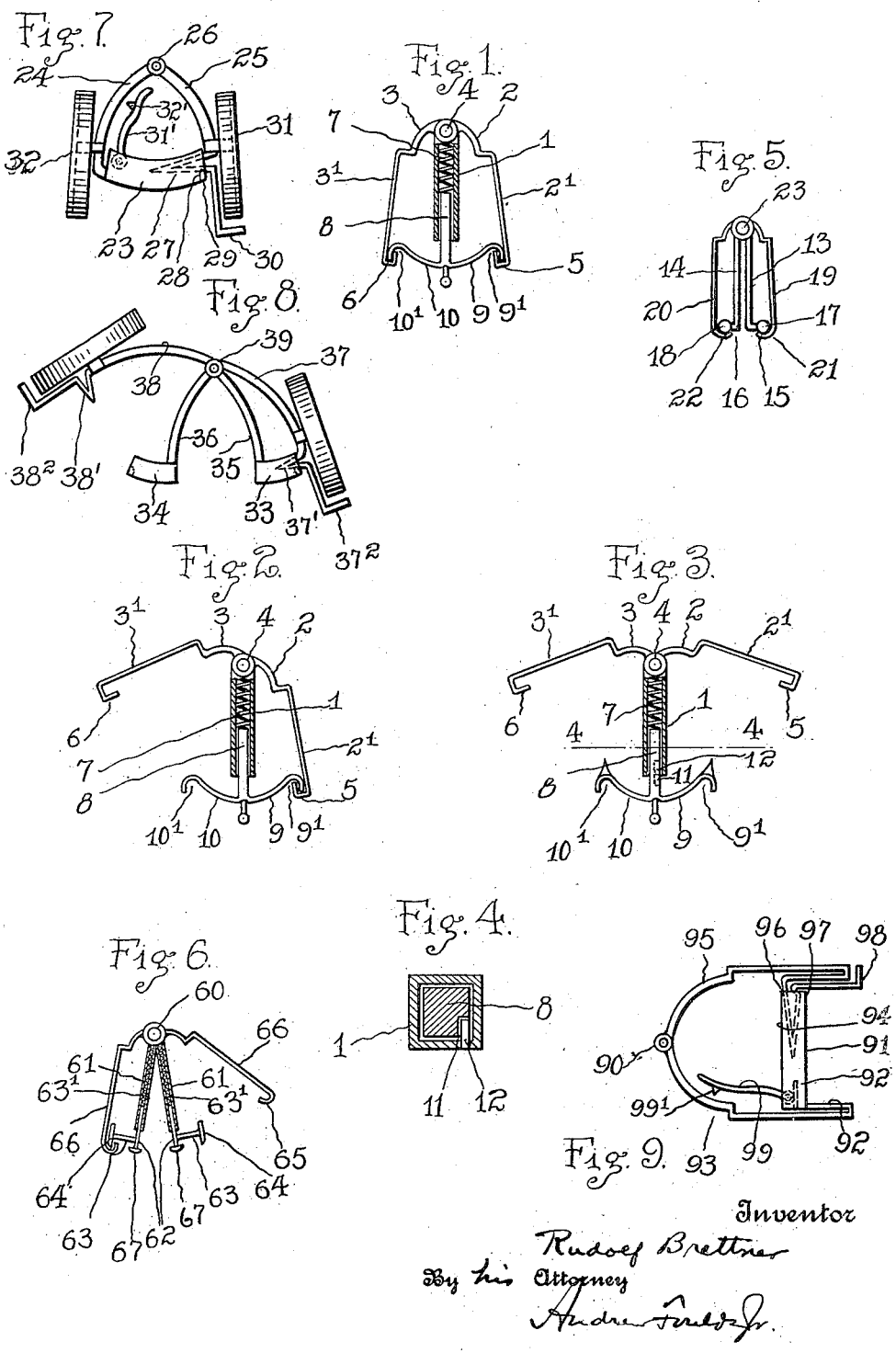

RUDOLF BRETTNER, OF NEWARK, NEW JERSEY.

CUFF-LINK.

1,376,075.  Specification of Letters Patent.  Patented Apr. 26, 1921.

Application filed June 19, 1919. Serial No. 305,320.

*To all whom it may concern:*

Be it known that I, RUDOLF BRETTNER, a citizen of the United States, residing at the city of Newark, in the county of Essex and State of New Jersey, have invented certain new and useful Improvements in Cuff-Links, of which the following is a specification.

My invention relates to improvements in cuff links and the object of my invention is to provide a simple, convenient and efficient cuff link.

I accomplish this object by the device illustrated in the accompanying drawings in which—

Figure 1 is a view of one form of the device closed, with part of the post cut away;

Fig. 2 is a view of the same with one side or link open;

Fig. 3 is a view of the same with both sides or links open,

Fig. 4 is a cross section of the post on the line 4—4 in Fig. 3;

Figs. 5, 6, 7, 8 and 9 are views of optional forms of the device.

Similar characters refer to similar parts throughout the several views.

Referring to the drawings, 1 is a hollow post adjacent the base of which are two link members 2 and 3 connected at their ends by a hinge joint 4, and each provided with hooked end sections 5 and 6, respectively.

Sections $2^1$ and $3^1$ respectively of the members 2 and 3 intermediate their ends, are preferably broadened out and may be suitably ornamented as desired in the manner of the usual cuff link or button.

In the post 1 I provide a spring 7 adapted to bear against a rod 8 which slides in the post 1 and the spring 7 serves to normally press the rod 8 outwardly, to engage the hooked end sections 5 and 6 of the link members 2 and 3 with the branches or arms 9 and 10 of the rod 8, which are provided adjacent their ends with seats $9^1$ and $10^1$ respectively, lying in the plane of the said respective hook sections 5 and 6 with which they are adapted to engage and lock.

I prefer to construct the post 1 and rod 8 square in cross section to prevent rotation and to maintain the cross arms 9 and 10 in position to engage the members 2 and 3 as herein described. I also prefer to provide in the rod 8 a cut-out socket 11 in which is seated a stud 12 to limit the movement of the rod 8.

It will thus be apparent that the links 2 and 3 are detachably engaged by the arms 9 and 10 and may be readily released by depressing the post 8 which carries the arms 9 and 10.

The device being thus assembled, the links 2 and 3 are opened and may be inserted in the button holes of a cuff or the like and are then brought over and locked upon the arms 9 and 10 respectively whereby the cuff will be securely but detachably fastened as desired and the device may be readily removed from the cuff by depressing the post 8 and thereby releasing the links 2 and 3.

In the optional form of the device illustrated in Fig. 5 I provide two counterpart posts 13 and 14 having bent over ends 15 and 16 respectively provided with knobs 17 and 18. I also provide two links 19 and 20 having branches 21 and 22 respectively adapted to engage the knobs 17 and 18. The posts 13 and 14 and links 19 and 20 are joined at their base by hinge 23. The links 19 and 20 intermediate their ends may be broadened and decorated or otherwise ornamented in any desired manner. As will be apparent, the two sections comprising the post 13 and link 19 and the post 14 and link 20 respectively, hinged at their base 23, may each be opened and closed independently. In use the link 19 or 20 is detached from the engaging knob and may be inserted in a button hole of a cuff or the like and then brought over and snapped upon the engaging knob 17 or 18 respectively, the resiliency of the metal causing the parts to lock securely as the ends of the hooks 21 and 22 extend beyond the center of the respective knobs 17 and 18 and they may be released from said frictional engagement by a slight withdrawing pressure.

In the optional form of the device illustrated in Fig. 6, I provide two counterpart sections hinged together at their base 60 and each comprising a hollow post 61 in which I seat a sliding rod 62 which is normally pressed outwardly by a spring $63^1$. The rod 62 is provided with a branch 63 which terminates in a knob 64 adapted to be engaged by the bent over end section 65 of the arms or links 66 which are released from engagement therewith by pressure on the stud 67 of the rod 62 which will depress the same into the post 61 and thereby release the hook section 65 of the link 66.

In the optional form of the device illustrated in Fig. 7, I provide a hollow post 23 set at an approximately right angle on the arm 24. An arm 25 is attached to the arm 24 by a hinge 26.

Intermediate the ends of the arm 25 I provide a bent out spring catch section 27 adapted to enter the hollow post 23 and having a notch seat 28 adapted to be engaged by a tooth 29 in the post 23. The arm 25 terminates in a projecting section 30 whereby pressure thereon will serve to release the spring catch section from engagement with the post 23. If desired buttons 31 and 32 may be mounted on the arms 25 and 24 respectively for decorative effect.

In use the post 23 is inserted in the button holes of a cuff or the like and the arm 25 is then brought over and locked in the post 23 and may be detached by pressure upon the end 30 of the arm 25 which will compress the spring catch 27 and thereby release it from its engagement with the post 23.

If desired a spring arm 31¹ may be mounted on the post 23 and may be provided with a pin 32¹ to hold the device in the cuff when open.

In the optional form of the device illustrated in Fig. 8, I have shown two hinged counterpart sections adapted to be used independently in each button hole of the cuff.

Each section of this optional form comprises a hollow post 33 and 34 carried by arms 35 and 36 respectively. Arms 37 and 38 are provided intermediate their ends with spring catches 37¹ and 38¹ respectively adapted to enter and lock upon the posts 33 and 34 respectively and are adapted to be released by pressure upon the end sections 37² and 38² of the springs 37¹ and 38¹. The arms 35, 36, 37 and 38 are hinged together at their base 39.

In the optional form of the device illustrated in Fig. 9, I construct each of the sections of a single strip of metal hinged together at their base 90. The hollow post 91 is mounted upon the bent over end section 92 of the arm 93 and is adapted to receive a bent over spring section 94 of the arm 95. A notch 96 is formed in the section 94 to engage a tooth 97 of the post 91. The end section 98 of the arm 95 is bent over to form a releasing lever for the spring catch 94. If desired a clip may be formed for holding the device in the cuff when open. I prefer for this purpose to use an arm 99 provided with a pin 99¹ mounted in the post 91 and normally pressed down by a bent up section 92¹ of the arm 92.

I have thus shown and described several forms of my improved device but further changes and modifications of detail may be made without departing from the spirit of my invention.

Having thus described my invention what I claim is:

1. In a device of the character described, the combination of a hollow post, a rod therein, having a branch section, a spring adapted to normally press the said rod outward, a link flexibly secured at the base of the hollow post and adapted to detachably engage the branch section of the rod substantially as shown and described.

2. In a device of the character described, the combination of a post, a rod having a sliding connection with said post, means for projecting the end of said rod beyond said post, a link flexibly secured on said post and means for detachably engaging said rod and link at their free ends.

3. In a device of the character described the combination of a post, a rod thereon having a branch section, a link flexibly secured to said post and having a bent over end section adapted to detachably engage the branch section of the rod.

4. In a device of the character described, the combination of a post, a member slidable on said post, a link flexibly secured to said post and having hooked end section adapted to detachably engage the member slidable on the post and a stud on said slidable member whereby the said member may be depressed substantially as shown and described.

5. In a device of the character described, the combination of a plurality of posts flexibly joined at the base, a rod in each of said posts, means for projecting the ends of said rods beyond the free ends of the posts, branches on said rods, links flexibly secured to the base of said posts and each having a bent over end section adapted to detachably engage the branches of the rods.

6. In a device of the character described the combination of a post, a branch section on the post, a knob on said branch section, an arm having an end section adapted to detachably engage said knob and a flexible union between the post and the arm.

In testimony whereof I affix my signature.

RUDOLF BRETTNER.